(12) United States Patent
Estes et al.

(10) Patent No.: US 11,263,179 B2
(45) Date of Patent: Mar. 1, 2022

(54) SYSTEM FOR COLLABORATIVE EDITING BASED ON DOCUMENT EVALUATION

(71) Applicant: Microsoft Technology Licensing, LLC, Redmond, WA (US)

(72) Inventors: Paul Fraedrich Estes, Bellevue, WA (US); Raymond R. Ringhiser, Maple Valley, WA (US); Keith Douglas Senzel, Seattle, WA (US); Jered D Aasheim, Eugene, OR (US); David B Appel, Seattle, WA (US); Peter E Loforte, Bellevue, WA (US); Pranish Atul Kumar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/009,988

(22) Filed: Jun. 15, 2018

(65) Prior Publication Data
US 2019/0384833 A1    Dec. 19, 2019

(51) Int. Cl.
*G06F 16/176*    (2019.01)
*G06F 21/62*    (2013.01)
(Continued)

(52) U.S. Cl.
CPC ............ *G06F 16/176* (2019.01); *G06F 9/453* (2018.02); *G06F 16/93* (2019.01);
(Continued)

(58) Field of Classification Search
CPC ...... G06F 16/176; G06F 40/166; G06F 9/453; G06F 21/6209; G06Q 10/101
See application file for complete search history.

(56) References Cited

U.S. PATENT DOCUMENTS

| 5,774,118 A | 6/1998 | Hatakama |
|---|---|---|
| 6,606,613 B1 | 8/2003 | Altschuler et al. |

(Continued)

FOREIGN PATENT DOCUMENTS

| CN | 107464043 A | 12/2017 |
|---|---|---|
| WO | 01027847 A1 | 4/2001 |

(Continued)

OTHER PUBLICATIONS

"International Search Report and Written Opinion Issued in PCT Application No. PCT/US19/062887", dated Feb. 12, 2020, 13 Pages.

(Continued)

*Primary Examiner* — Marc S Somers
(74) *Attorney, Agent, or Firm* — Schwegman Lundberg & Woessner, P.A.

(57) ABSTRACT

A method may include receiving request from a first user via an application, for assistance with completion of a document within the application; determining expected characteristics of the completed document, the expected characteristics identifying: a plurality of tasks to be performed to generate the completed document; and a document value; performing a computer-implemented matching process to match the first user with a second user based on the plurality of tasks and document value; and configuring permissions of the application to allow collaborative editing within the application between the first user and second user to complete the document.

17 Claims, 10 Drawing Sheets

(51) Int. Cl.
*G06F 9/451* (2018.01)
*G06F 16/93* (2019.01)
*G06Q 30/02* (2012.01)

(52) U.S. Cl.
CPC ...... *G06F 21/6209* (2013.01); *G06F 21/6218* (2013.01); *G06Q 30/0241* (2013.01)

(56) References Cited

U.S. PATENT DOCUMENTS

| | | | |
|---|---|---|---|
| 6,691,159 B1 | 2/2004 | Grewal et al. | |
| 7,177,316 B1 | 2/2007 | Pilecek | |
| 7,672,543 B2 | 3/2010 | Hull et al. | |
| 7,680,901 B2 | 3/2010 | Rechterman et al. | |
| 7,730,030 B1 | 6/2010 | Xu | |
| 7,802,305 B1 | 9/2010 | Leeds | |
| 7,848,971 B1 | 12/2010 | Mori et al. | |
| 7,865,457 B2 | 1/2011 | Ravin et al. | |
| 7,933,815 B2 | 4/2011 | Hutty et al. | |
| 8,151,192 B2 | 4/2012 | Black et al. | |
| 8,280,882 B2 | 10/2012 | Troy et al. | |
| 8,473,423 B2 | 6/2013 | Krishnakumar et al. | |
| 8,516,108 B2 | 8/2013 | Shaw | |
| 8,543,532 B2 | 9/2013 | Sathish et al. | |
| 8,639,552 B1 * | 1/2014 | Chen | G06F 9/4881 |
| | | | 705/7.21 |
| 8,666,961 B1 | 3/2014 | Qureshi et al. | |
| 8,676,806 B2 * | 3/2014 | Simard | G06F 16/93 |
| | | | 707/741 |
| 8,719,706 B2 | 5/2014 | Harris et al. | |
| 8,732,662 B1 * | 5/2014 | Savant | G06F 9/4451 |
| | | | 717/120 |
| 8,972,747 B2 | 3/2015 | Simske et al. | |
| 9,002,700 B2 * | 4/2015 | Hoover | G06F 40/289 |
| | | | 704/9 |
| 9,020,887 B2 | 4/2015 | Ngo et al. | |
| 9,077,804 B2 | 7/2015 | Kannan et al. | |
| 9,230,031 B2 | 1/2016 | Ickman et al. | |
| 9,256,886 B2 | 2/2016 | Heer | |
| 9,430,299 B2 | 8/2016 | Naveh et al. | |
| 9,584,517 B1 | 2/2017 | Roth et al. | |
| 9,635,181 B1 | 4/2017 | McGann et al. | |
| 9,646,143 B2 | 5/2017 | Lavinio | |
| 9,686,086 B1 | 6/2017 | Nguyen et al. | |
| 9,716,745 B2 | 7/2017 | Santero et al. | |
| 9,735,973 B2 | 8/2017 | Tabrizi et al. | |
| 9,767,486 B2 | 9/2017 | Mihalik et al. | |
| 9,959,577 B1 | 5/2018 | Mori | |
| 10,230,816 B2 | 3/2019 | Banatwala et al. | |
| 10,380,516 B1 | 8/2019 | Kislaki et al. | |
| 10,439,836 B2 | 10/2019 | Rosenberg et al. | |
| 2003/0182450 A1 | 9/2003 | Ong et al. | |
| 2004/0243614 A1 | 12/2004 | Boone et al. | |
| 2005/0256695 A1 | 11/2005 | Oh | |
| 2005/0268234 A1 | 12/2005 | Rossi et al. | |
| 2006/0047615 A1 | 3/2006 | Ravin et al. | |
| 2006/0059151 A1 * | 3/2006 | Martinez | G06F 16/35 |
| 2006/0075228 A1 | 4/2006 | Black et al. | |
| 2006/0242558 A1 | 10/2006 | Racovolis et al. | |
| 2007/0050360 A1 | 3/2007 | Hull et al. | |
| 2007/0179958 A1 | 8/2007 | Chen et al. | |
| 2008/0215976 A1 | 9/2008 | Bierner et al. | |
| 2008/0320081 A1 | 12/2008 | Shriver-Blake et al. | |
| 2009/0025063 A1 | 1/2009 | Thomas | |
| 2009/0182885 A1 | 7/2009 | Sang et al. | |
| 2009/0183072 A1 | 7/2009 | Stephenson et al. | |
| 2009/0199097 A1 | 8/2009 | Black et al. | |
| 2009/0287682 A1 | 11/2009 | Fujioka et al. | |
| 2010/0004944 A1 | 1/2010 | Palaniappan | |
| 2010/0146483 A1 | 6/2010 | Komarov et al. | |
| 2010/0146583 A1 | 6/2010 | Prehofer et al. | |
| 2010/0174783 A1 | 7/2010 | Zarom | |
| 2010/0250529 A1 | 9/2010 | Surendran et al. | |
| 2011/0053126 A1 | 3/2011 | Bielenberg et al. | |
| 2011/0238670 A1 | 9/2011 | Mercuri | |
| 2011/0307408 A1 * | 12/2011 | Gates | G06Q 10/10 |
| | | | 705/342 |
| 2012/0076283 A1 | 3/2012 | Ajmera et al. | |
| 2012/0109883 A1 | 5/2012 | Iordanov et al. | |
| 2012/0117070 A1 | 5/2012 | Hiltz-laforge et al. | |
| 2013/0124649 A1 | 5/2013 | Triantos et al. | |
| 2013/0204886 A1 | 8/2013 | Faith et al. | |
| 2013/0253969 A1 | 9/2013 | Das et al. | |
| 2013/0304758 A1 | 11/2013 | Gruber et al. | |
| 2014/0013451 A1 | 1/2014 | Kulka et al. | |
| 2014/0025441 A1 | 1/2014 | Eberlein et al. | |
| 2014/0067964 A1 * | 3/2014 | Grishaver | G06Q 50/01 |
| | | | 709/206 |
| 2014/0074272 A1 | 3/2014 | Cowden, IV | |
| 2014/0082072 A1 * | 3/2014 | Kass | H04L 67/22 |
| | | | 709/204 |
| 2014/0108183 A1 | 4/2014 | Davis | |
| 2014/0137074 A1 | 5/2014 | Hey et al. | |
| 2014/0237037 A1 | 8/2014 | Waingold | |
| 2014/0237241 A1 | 8/2014 | Kurosawa et al. | |
| 2014/0270108 A1 | 9/2014 | Riahi et al. | |
| 2014/0289702 A1 | 9/2014 | Mcmahon et al. | |
| 2014/0324757 A1 | 10/2014 | Tabrizi et al. | |
| 2015/0074033 A1 | 3/2015 | Shah | |
| 2015/0154526 A1 * | 6/2015 | Yates | G06Q 10/06393 |
| | | | 705/7.39 |
| 2015/0186153 A1 | 7/2015 | Voronkov et al. | |
| 2015/0200893 A1 | 7/2015 | Harris et al. | |
| 2015/0200922 A1 | 7/2015 | Eschbach et al. | |
| 2015/0206063 A1 | 7/2015 | Santero et al. | |
| 2015/0288748 A1 | 10/2015 | Oh | |
| 2015/0310446 A1 | 10/2015 | Tuchman et al. | |
| 2015/0363405 A1 | 12/2015 | Biswas et al. | |
| 2016/0063269 A1 | 3/2016 | Liden et al. | |
| 2016/0112212 A1 | 4/2016 | Tabrizi et al. | |
| 2016/0117941 A1 | 4/2016 | Mitchell et al. | |
| 2016/0179810 A1 | 6/2016 | Bolshinsky et al. | |
| 2016/0224766 A1 | 8/2016 | Steelberg et al. | |
| 2016/0253426 A1 | 9/2016 | Snapir et al. | |
| 2016/0267188 A1 | 9/2016 | Spaulding et al. | |
| 2016/0267423 A1 | 9/2016 | Braun et al. | |
| 2016/0380933 A1 | 12/2016 | Topaltzas et al. | |
| 2017/0011308 A1 | 1/2017 | Sun et al. | |
| 2017/0048245 A1 | 2/2017 | Owen et al. | |
| 2017/0132186 A1 | 5/2017 | Plummer | |
| 2017/0178078 A1 | 6/2017 | Fernando | |
| 2017/0185589 A1 | 6/2017 | Neff et al. | |
| 2017/0205965 A1 * | 7/2017 | Goel | G06Q 10/103 |
| 2017/0223190 A1 | 8/2017 | Mandel et al. | |
| 2017/0270079 A1 | 9/2017 | Rajwat et al. | |
| 2017/0288879 A1 | 10/2017 | Quinlan et al. | |
| 2017/0308610 A1 | 10/2017 | Mullins et al. | |
| 2018/0004976 A1 | 1/2018 | Davis et al. | |
| 2018/0067903 A1 | 3/2018 | Maker et al. | |
| 2018/0068274 A1 | 3/2018 | Buffington | |
| 2018/0089156 A1 | 3/2018 | Kapoor et al. | |
| 2018/0096437 A1 | 4/2018 | Sun et al. | |
| 2018/0150571 A1 | 5/2018 | Douglas et al. | |
| 2018/0189461 A1 | 7/2018 | Ghafourifar et al. | |
| 2018/0197428 A1 | 7/2018 | Baphna et al. | |
| 2018/0322644 A1 | 11/2018 | Sunkavalli et al. | |
| 2019/0121827 A1 | 4/2019 | Boswell et al. | |
| 2019/0129973 A1 | 5/2019 | Truong et al. | |
| 2019/0291010 A1 | 9/2019 | Benedetto et al. | |
| 2019/0384686 A1 | 12/2019 | Estes et al. | |
| 2019/0384832 A1 | 12/2019 | Estes et al. | |
| 2019/0392049 A1 | 12/2019 | Estes et al. | |
| 2019/0394257 A1 | 12/2019 | Estes et al. | |
| 2020/0174998 A1 | 6/2020 | Kumar et al. | |
| 2020/0226231 A1 | 7/2020 | Kumar et al. | |

FOREIGN PATENT DOCUMENTS

| | | |
|---|---|---|
| WO | 2009076555 A2 | 6/2009 |
| WO | 2013091709 A1 | 6/2013 |
| WO | 2014012138 A1 | 1/2014 |
| WO | 2017210032 A1 | 12/2017 |

(56) References Cited

FOREIGN PATENT DOCUMENTS

OTHER PUBLICATIONS

"Web 2.0—Wikipedia", Retrieved from https://en.wikipedia.org/wiki/Web_2.0, Retrieved on Jan. 25, 2018, 16 Pages.
Adler, et al., "A Content-Driven Reputation System for the Wikipedia", In Proceedings of the 16th International Conference on World Wide Web Conference, May 8, 2007, 10 Pages.
Coyle, James E., Jr., "Wikis in the College Classroom: A Comparative Study of Online and Face-to-Face Group Collaboration at a Private Liberal Arts University", In Thesis Submitted to the Education, Health, and Human Services in Partial Fulfillment of the Requirements for the Degree of Doctor of Philosophy, May 2007, 273 Pages.
Koch, Michael, "Community Support in Universities—The Drehscheibe Project", In Proceedings of 1st International Conference on Communities and Technologies, Jan. 2003, 19 Pages.
Zheng, et al., "A Deep Learning Approach for Expert Identification in Question Answering Communities", In Journal of Computing Research Repository, Nov. 14, 2017, 7 Pages.
"Non-Final Office Action Issued in U.S. Appl. No. 16/013,534", dated Oct. 21, 2019, 9 Pages.
Allaho, et al., "Increasing the Responsiveness of Recommended Expert", In Proceedings of the 23rd ACM International Conference on Conference on Information and Knowledge Management, Nov. 3, 2014, pp. 749-758.
"International Search Report and Written Opinion Issued in PCT Application No. PCT/US2019/036642", dated Aug. 21, 2019, 12 Pages.
"International Search Report and Written Opinion Issued in PCT Patent Application No. PCT/US2019/035897", dated Sep. 19, 2019, 12 Pages.
"International Search Report and Written Opinion Issued in PCT Patent Application No. PCT/US2019/035915", dated Sep. 18, 2019, 13 Pages.
"International Search Report and Written Opinion Issued in PCT Patent Application No. PCT/US2019/036204", dated Sep. 30, 2019, 11 Pages.
"Peerwith Expert Interface and Payment", Retrieved from: https://www.youtube.com/watch?v=mOE22Geyhgl, Apr. 23, 2018, 1 Page.
"International Search Report and Written Opinion Issued in PCT Application No. PCT/US19/035904", dated Sep. 4, 2019, 11 Pages.
"International Search Report and Written Opinion Issued in PCT Application No. PCT/US19/036205", dated Sep. 10, 2019, 12 Pages.
Rogstadius, et al., "Towards Real time Emergency Response using Crowd Supported Analysis of Social Media", In Proceedings of CHI workshop on crowdsourcing and human computation, systems, studies and platforms, May 7, 2011, 3 Pages.
Sethi, et al., "A Social Collaboration Argumentation System for Generating MultiFaceted Answers in Question & Answer Communities", In Proceedings of AAAI Workshop on Computational Models of Natural Argument, Aug. 7, 2011, 5 Pages.
Sethi, Ricky J., "Fact Checking via Structured Discussions in Virtual Communities", In Proceedings of 3rd International Workshop on Social Media World Sensors, Jul. 4, 2017, 2 Pages.
"Non Final Office Action Issued in U.S. Appl. No. 16/206,644", dated Sep. 11, 2020, 10 Pages.
"International Search Report and Written Opinion Issued in PCT Application No. PCT/US2019/069033", dated Mar. 27, 2020, 11 Pages.
"Non Final Office Action Issued in U.S. Appl. No. 16/013,530", dated Apr. 30, 2020, 10 Pages.
"Notice of Allowance issued in U.S. Appl. No. 16/013,534", dated Apr. 16, 2020, 18 Pages.
"Non Final Office Action Issued in U.S. Appl. No. 16/013,554", dated Mar. 19, 2020, 14 Pages.
"Non-Final Office Action Issued in U.S. Appl. No. 16/009,970", dated Jun. 26, 2020, 18 Pages.
"Final Office Action Issued in U.S. Appl. No. 16/013,530", dated Nov. 9, 2020, 10 Pages.
"Notice of Allowance Issued in U.S. Appl. No. 16/013,554", dated Oct. 27, 2020, 15 Pages.
"Non-Final Office Action Issued in U.S. Appl. No. 16/009,946", dated Sep. 25, 2020, 27 Pages.
"Non Final Office Action issued in U.S. Appl. No. 16/009,970", dated Mar. 8, 2021, 22 Pages.
"Non Final Office Action Issued in U.S. Appl. No. 16/247,410", dated Mar. 18, 2021, 16 Pages.
"Final Office Action Issued in U.S. Appl. No. 16/009,946", dated May 7, 2021, 30 Pages.
"Notice of Allowance Issued in U.S. Appl. No. 16/013,530", dated Apr. 22, 2021, 10 Pages.
"Final Office Action Issued in U.S. Appl. No. 16/206,644", dated Feb. 12, 2021, 15 Pages.
"Final Office Action issued in U.S. Appl. No. 16/009,970", dated Nov. 16, 2020, 20 Pages.
"Final Office Action Issued in U.S. Appl. No. 16/009,970", dated Aug. 11, 2021, 26 Pages.
"Final Office Action issued in U.S. Appl. No. 16/247,410", dated Oct. 20, 2021, 18 Pages.
"Non Final Office Action Issued in U.S. Appl. No. 16/009,946", dated Dec. 24, 2021, 75 Pages.
"Non Final Office Action Issued in U.S. Appl. No. 16/009,970", dated Nov. 26, 2021, 28 Pages.
"Notice of Allowance Issued in U.S. Appl. No. 16/206,644", dated Dec. 14, 2021, 14 Pages.

\* cited by examiner

FIG. 2

| ORDER ID | ORDER DATE | PHONE NUMBER | CUSTOMER NAME | STATE |
|---|---|---|---|---|
| 1 | 3/12/16 | 612-555-3234 | KIMBERLY J. LOPEZ | MN |
| 2 | 3/24/16 | 612-555-3455 | FRANCIS M. GRAY | MN |
| 3 | 3/31/16 | 612-555-2345 | JENNY SMITH | MN |
| 4 | 6/14/16 | 202-555-3455 | KATHERINE S. STANBACK | DC |
| 5 | 6/17/16 | 763-555-1269 | JENNY SMITH | MN |
| 6 | 8/2/16 | 408-555-8734 | MATT CARARILLO | CA |
| 7 | 9/1/16 | 410-555-2345 | LINCOLN WHITE | MD |
| 8 | 10/17/16 | 501-376-6023 | LEE G. WILLIAMS | AK |
| 9 | 12/10/16 | 612-555-2345 | JENNY SMITH | MN |
| 10 | 1/12/17 | 612-555-2745 | FRANCIS M. GRAY | MN |
| 11 | 3/12/17 | 612-555-8964 | MICHAEL P. HUFNAGEL | MN |
| 12 | 6/12/17 | 612-555-2345 | JENNY SMITH | MN |
| 13 | 7/25/17 | 337-555-1385 | JAMES MONTES | LA |
| 14 | 8/19/18 | 612-555-2345 | JENNY SMITH | MN |

HELP  206

CREATE A REPORT

CONNECT WITH AN EXPERT WHO CAN HELP

[ CONNECT ]

SEARCH RESULTS

CREATE A DATA MODEL

CALENDAR TEMPLATES

CREATE A PIVOT TABLE

CREATE A CHART

| ORDER ID | ORDER DATE | PHONE NUMBER | CUSTOMER NAME | STATE | REQUEST DETAILS |
|---|---|---|---|---|---|
| 1 | 3/12/16 | 612-555-3234 | KIMBERLY J. LOPEZ | MN | WHAT IS YOUR REQUESTED DUE DATE? |
| 2 | 3/24/16 | 612-555-3455 | FRANCIS M. GRAY | MN | |
| 3 | 3/31/16 | 612-555-2345 | JENNY SMITH | MN | |
| 4 | 6/14/16 | 202-555-3455 | KATHERINE S. STANBACK | DC | PLEASE ENTER AN AMOUNT YOU ARE WILLING TO SPEND |
| 5 | 6/17/16 | 763-555-1269 | JENNY SMITH | MN | |
| 6 | 8/2/16 | 408-555-8734 | MATT CARARILLO | CA | |
| 7 | 9/1/16 | 410-555-2345 | LINCOLN WHITE | MD | WHO IS YOUR INTENDED AUDIENCE? |
| 8 | 10/17/16 | 501-376-6023 | LEE G. WILLIAMS | AK | |
| 9 | 12/10/16 | 612-555-2345 | JENNY SMITH | MN | |
| 10 | 1/12/17 | 612-555-2745 | FRANCIS M. GRAY | MN | |
| 11 | 3/12/17 | 612-555-8964 | MICHAEL P. HUFNAGEL | MN | |
| 12 | 6/12/17 | 612-555-2345 | JENNY SMITH | MN | |
| 13 | 7/25/17 | 337-555-1385 | JAMES MONTES | LA | |
| 14 | 8/19/18 | 612-555-2345 | JENNY SMITH | MN | |

FIG. 3

SYSTEM FOR COLLABORATIVE EDITING BASED ON DOCUMENT EVALUATION

BACKGROUND

Modern software often allows multiple users to edit a single document. A local copy of the documents may exist on respective computing devices of the multiple users, but permissions and version control may be managed by an online service (e.g., a cloud-based document management service). For example, a first user may grant permission to a second user to edit a document the first user created. The network service may also provide online editing of the document. Online edits may be promulgated back down to local copies.

Most software also includes search functionality for helping users create documents associated with the software. For example, a spreadsheet application may include help entries for built-in function call for use in cells and help entries on chart creation. The help entries are stored within the application or stored in an online location, in various examples.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 2 illustrates a user interface for requesting assistance with document completion, according to various examples.

FIG. 3 illustrates a user interface for presenting document characteristic questions, according to various examples.

DETAILED DESCRIPTION

Figure 1:
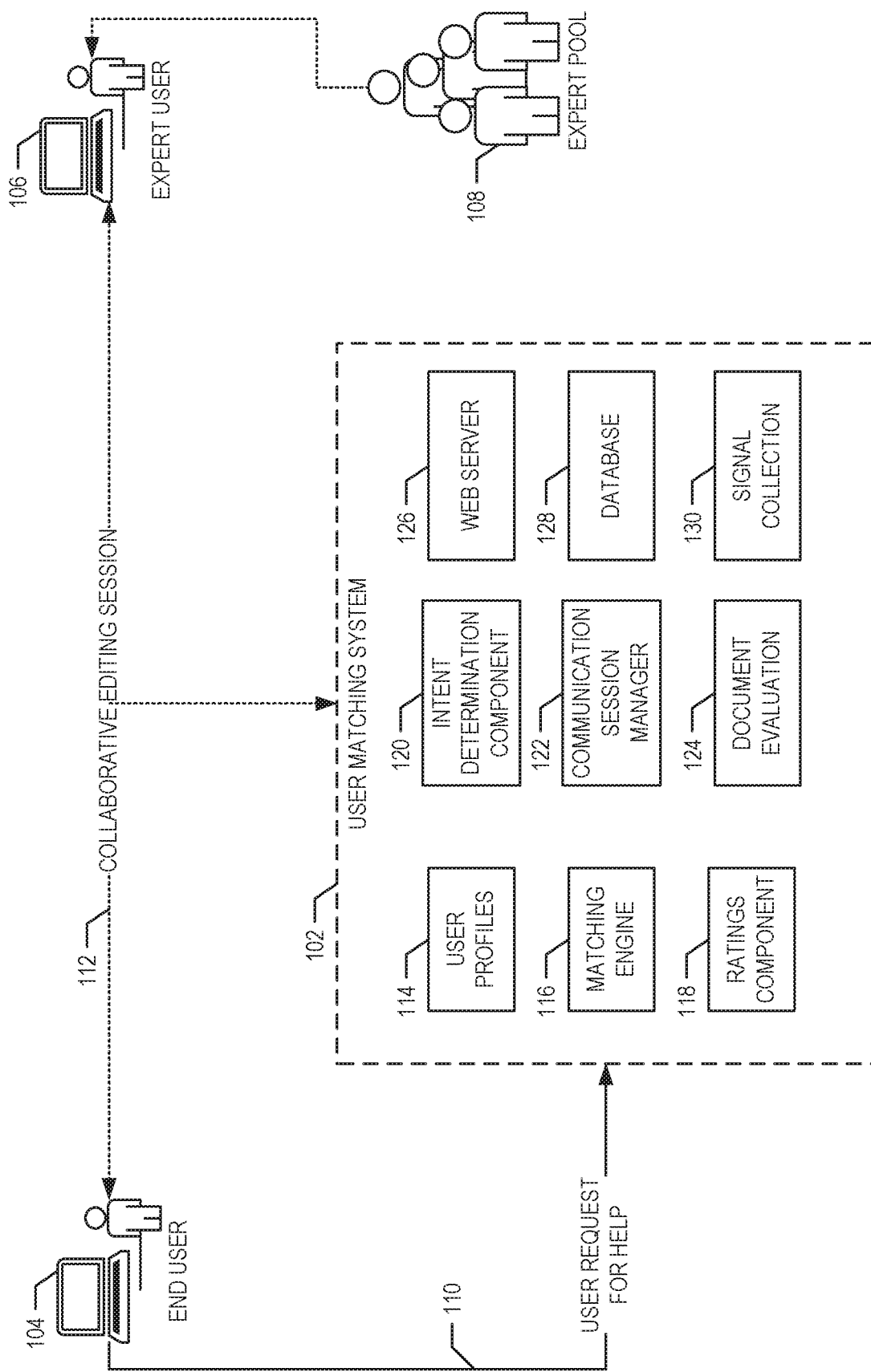
FIG. 1 is schematic diagram illustrating a collaborative editing session established by a user matching system, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. Described systems and methods may provide a user interface for an end-user or administrator to edit the variable values in some instances.

Modern computer programs (applications) often include functionality in the form of features that an end user does not know exist. This is a separate problem from knowing a feature exists, but the user not knowing how to use it, in the latter scenario, an online or in-application help section may explain how to use the features; however, if users do not know the feature exists, they cannot ask for help.

For example, a user may have an end goal—such as, performing an analysis of product sales. The user may have a spreadsheet document containing the data, but have no idea how to, via an application, generate a document with the necessary analysis. One solution may be for the user to go online and request help using a request for proposal (RFP) style bidding process. Then, the user may transmit the spreadsheet to an expert user who won the bid and the spreadsheet document may be completed by the expert user.

The REP solution has a number of challenges. First, the user requesting help has to leave the application to request help, which creates inefficiencies to complete the task. Second, the user may have no way to verify that the expert user is actually an expert. Third, data privacy may be compromised by transmitting the data to the expert user outside of a secured environment.

In order to overcome the challenges of the REP model (and other prior solutions), a number of technical problems may be addressed in the areas of user interface design, encryption, data privacy, data access control, artificial intelligence/machine learning, and user activity monitoring. For example, new user interfaces may be generated, within an application, to allow an end user to request help without requiring computing resources to be used with opening an additional application to request the help. Resources may be further conserved by permitting data access to the expert user within the application itself—as opposed to transmitting a document to the expert user via another application. Additional benefits may be realized to one skilled in the art after reading this disclosure Described herein is a user matching system that alleviates the technical challenges described previously. Consider that an end user is working in an application and needs help with creating a document with a set of characteristics. For illustration purposes, the characteristics include a document that describes which products were sold in the highest quantity, broken down by month and region of a sales area, and the application is a spreadsheet application. Furthermore, the end user may not even know if the spreadsheet application can help with creating the document the end user needs, but decides help is needed.

The end user may then, within the application, request help by describing the end goal of a completed document. The user matching system may receive the request and description, and then initiate a matching process to pair the end user with an expert user—an expert at least with regards to that specific task—to help the end user with the task. In various examples, the request and matching process are not performed in real time. For example, the request may be received and then at a later time (e.g., in an overnight batch), the matching process may be performed. A collaborative document editing and communication session may be established between the end user and expert user. Within the session, the expert user may complete the document on behalf of the end user. In some examples, multiple expert users may be used to complete the document (e.g., each expert user may perform different tasks). More detailed descriptions of each of these operations is described below.

FIG. 1 is schematic diagram illustrating a collaborative editing session established by a user matching system, according to various examples. FIG. 1 illustrates user matching system 102, end user 104, expert user 106, expert pool 108, user request 110, and collaborative editing session 112. User matching system 102, as illustrated, includes user profiles 114, matching engine 116, ratings component 118, intent determination component 120, communication session manager 122, document evaluation 124, web server 126, database 128, and signal collection 130.

For illustration purposes, user matching system 102 is illustrated as set of separate components (e.g., matching engine 116, ratings component 118, etc.). However, the functionality of multiple, individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in parallel across multiple processing units. Execution of the code may be performed on a single device or distributed across multiple devices. In some example, the program code is executed on a cloud platform (e.g., MICROSOFT AZURE® or AMAZON EC2®) using shared computing infrastructure.

In various examples, the assets and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

A user (e.g., end user 104 or expert user 106) may interact with a variety of systems/devices and a user have more than one role within each system. For example, a user, Alice, may request help from another user, Bob, within an application to complete a document. Alice may also help out a third user, Charlie, with a document within a different application. Throughout this disclosure, a user may be referred to with a modifier indicating the role the user is currently acting upon. For example, an expert user may be a user that has been paired up with an end user to help perform a task.

Users may have additional roles beyond being an expert user or end user. For example, a user may have a role as a contributor. A contributor user may edit or generate content in a document repository. An administrator user may edit backend scoring formulas, machine learning algorithms, etc.

A user may be represented in user matching system 102 as a user profile data structure stored within user profiles 114. User profiles 114 may be part of another database (e.g., database 128) or exist as a standalone database. The user profile data structure may include additional data structures. For example, the user profile data structure may include a one or more rating data structures that identifies ranking scores for the user's different roles (described in further detail herein with respect to FIG. 5).

The user profile data structure may include a user identification for the user. Each user identification may be unique. The user identification may be comprised of alphanumeric characters. The user identification is an e-mail address, in an example. The user identification may be shared across the roles of the user. Accordingly, a computer program may query user profiles 114 with a single user identification to retrieve data about the user for each role—as opposed to using a different user identification for each role. The user identification may be used across multiple application in an application suite and may be the same identification used as an enterprise login.

The user profile data structure may include entries associated with external sources of information associated with the user. An entry may include credentials (e.g., user id, tokens, etc.) and a logical access location (e.g., website/API URL) for the external source of information. Periodically (e.g., daily), signal collection 130 may retrieve data from the external sources as described further herein below. A user profile data structure may identify user characteristics with respect to a user. Characteristics may include, but are not limited to, demographics (age, etc.), application proficiencies (e.g., novice user of spreadsheet application XYZ) based on rating data structures, feature/task level proficiencies in an application, education level, and current and past jobs.

The user profile data structure may additional include availability information. For example, the information may indicate when (days, times, etc.) the user is available to help with another user. The information may also indicate whether or not the user is currently helping another user, and is therefore not currently available. In such an instance, the user profile may further include data indicating the expected period of time before the user is available again.

The user profile data structure may be established through a combination of manual and automated entry. As indicated above, a user's identification may persist across multiple systems. Thus, multiple systems may access and alter data in the user profile data structure. For example, user matching system 102 may provide a user interface (e.g., web, mobile, in-application, etc.) in which the user may view the data stored in their user profile data structure and edit the structure. In another example, an administrator user may access the user profile to add/edit details to a user's profile data structure.

End user 104 and expert user 106 may use client devices to communicate with user matching system 102, and each other. The client devices may comprise, but are not limited to, a smartphone, tablet, laptop, multi-processor system, microprocessor-based or programmable consumer electronics, game console, set-top box, or any other device that a user utilizes to communicate over a network. In example embodiments, the client devices comprise a display module (not shown) to display information (e.g., in the form of specially configured user interfaces). In some embodiments, the client devices comprise one or more of a touch screen, camera, keyboard, microphone, and Global Positioning System (GPS) device.

Matching engine 116 may be used to process user request 110 to select expert user 106 from expert pool 108. Upon determining a match, communication session manager 122 may be used to establish collaborative editing session 112. To select expert user 106, matching engine 116 may use the functionality of other components of user matching system 102 such as intent determination component 120 to determine the end goal of a document for end user 104; ratings component 118 to obtain ratings (e.g., application and task proficiencies) with respect to the end goal; and document evaluation 124 as a further signal as to user intent. More detailed explanations of these components are provided herein. The end user 104 and expert user 106 may establish collaborative editing session 112 and the attendant communications that support the collaborative editing session 112 directly or through user matching system 102 or a separate server (not shown for clarity).

Data used in user matching system 102 may be organized and stored in a variety of manners. For convenience, the organized collection of data is described herein as database 128. The specific storage layout and model used in database 128 may take a number of forms—indeed, database 128 may utilize multiple models. Database 128 may be, but is not limited to, a relational database (e.g., SQL), non-relational database (NoSQL), a flat file database, object model, document details model, graph database, shared ledger (e.g., blockchain), or a file system hierarchy. Database 128 may store data on one or more storage devices (e.g., a hard disk, random access memory (RAM), etc.). The storage devices may be in standalone arrays, part of one or more servers, and may be located in one or more geographic areas as part of shared computing infrastructure.

Web server 126 may be configured to serve data in the form of webpages or web applications to user matching system 102 and end user 104. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of one or more pages served by web server 126. In response, web server 126 may transmit a web page that is rendered on a display device user matching system 102 or end user 104.

User matching system 102 may use or define one or more application programming interfaces (API). An API provides a method for computing processes or systems to exchange data. A web-based API, such may be defined by user matching system 102 and accessed via web server 126 may permit users to upload and download documents from user matching system 102.

The API may define a set of HTTP calls according to Representational State Transfer (RESTful) practices. A RESTful API may define various GET, PUT, POST, DELETE methods to create, replace, update, and delete data stored on database 128. For example, "GET/preferences/userid" may be used to retrieve user preferences for the identification indicated by "userid." An API may transmit responses to requests for data according to the JavaScript Object Notation (JSON) format.

Because of the sensitive nature of data stored by and used by user matching system 102, various security measures may be used to protect data at rest and in transmit. For example, APIs may use tokens or API keys to ensure only authorized parties may retrieve or user matching system 102. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption.

As an additional privacy precaution, users may be provided an interface (e.g., via web server 126) to see data that has been collected by user matching system 102. The user may have the option of deleting some or all of the data. Furthermore, the user may set a time for expiration of the data. In various examples, users may have to opt-in to data collection before data may be collected by user matching system 102 for use in matching. Periodically, the user may be reminded that user matching system 102 is collecting the data.

FIG. 2 illustrates a user interface 200 for requesting assistance with document completion, according to various examples. FIG. 2 includes content portion 202 of a sample document and assistance portion 204 that includes help query 206, expert request 208, and query results 210.

User interface 200 may be associated with an application opened by end user 104 on the user's computing device. The application may be downloaded and executed locally on the computing device or accessed as a web application served by web server 126. Even while the application is executing locally, the application may communicate with user matching system 102 over a network connection to facilitate matching and collaborative editing of a document.

An application may be represented as a set of computer code stored on one or more storage devices and executed by one or more processing units (e.g., a core of a central processing unit, a graphics processing unit, etc.). In an example, functionality of an application may be integrated into one or more specialized circuits (e.g., application specific integrated circuit). A storage device or computer-readable storage medium is distinct from a signal-bearing medium, such as a transitory signal.

A user may interact with an application using input and output devices of a computing device. For example, the application may be presented on a display device of the computing device and the user may use a keyboard to enter data into the application.

An application may include a number of features (e.g., functionality) available to the user. For example, a word processing application may include a template feature to allow the user to create a resume. A spreadsheet applicant may include a feature to generate a pivot table or calculate net present value. A feature of application may be activated within the application by the user using an input device to select a menu item, click a user interface element on a toolbar, etc. Different applications may include common features. For example, multiple spreadsheet applications may include a pivot table feature. Some features may be unique to an application. The output of an application may be a document.

As illustrated, user interface 200 includes two portions: content portion 202 and assistance portion 204. Content portion 202 may be the editable portion of a document. Assistance portion 204 may relate to helping a user use the features of the application to complete the document. Although illustrated as part of a contiguous interface, assistance portion 204 may be displayed in separate windows, as a pull-out window from content portion 202, as a floating window, etc.

When using an application, a user often has an end goal in mind. For example, they may want to create a household budget, plan a wedding, or create a resume. As used herein, the end goal may also be referred to as a document intent. Upon completion of the document, according to a determined document intent, the user's end goal may be realized.

It may not be readily apparent to an application what the document intent is when a document is first created, but may be inferred based upon signals collected by signal collection 130 and document evaluation.

Document intent may be contrasted with feature intent. Feature intent may relate to features of an application that the user wishes to use to fulfill the document intent. For example, the user may want to know more about how to create a header or crop a picture.

With reference to assistance portion 204, an end user may enter in help query 206. In this example, the end user is requesting help with creating a report. The application may query a knowledge database and provide query results 210 based on the query. Query results 210 may relate to features of the application that may assist the end user in creating a report; however, the user may not know what these features are or if they are useful to generating a report that user needs. Accordingly, end user 104 may initiate a request via expert request 208 to work with an expert user to complete end user's 104 document.

FIG. 3 illustrates a user interface for presenting document characteristic questions, according to various examples. FIG. 3 includes content portion 202 and assistance portion 204. FIG. 3 may represent a view of the application in FIG. 2 after a user has initiated a request for help using expert request 208. As illustrated, assistance portion 204 has been updated to present a series of questions 302 related to the request for help. The questions may be used—in conjunction with additional collected signals—to determine the expected characteristics of the completed document for the user. The expected characteristics may include the expected content of the completed document (e.g., a resume) as well as completion preferences.

Completion preferences may be user-specific preferences with respect to an individual document completion request. For example, a due date such as when the end user needs the completed document may vary from request to request. Similarly, the intended audience and amount of money the user is willing to spend may be variable between requests.

In various examples, the completion preferences are set according to user matching system 102 to reduce the amount of questions presented to a user. For example, over a period of time user matching system 102 may store what a market rate is for a given task. Accordingly, the user may not need to potentially over pay for a given task.

Based at least on the expected characteristics of the completed document, a document intent may be determined by intent determination component 120. Database 128 may store a set of document intents as document intent data structures. Example document intents include updating a resume, creating a pitch deck for a start-up, and conducting a quantitative analysis of sales data. Each document intent may have variants. For example, creating a resume for a summer job may involve a different set of skills (and have a different value) than updating a resume of an executive. Document intents may conform to a standardized taxonomy (e.g., ontology) in some instances. Accordingly, document intents may be hierarchical such that the skills needed to perform a parent document flow to the document intent's children.

Document intents may be managed created, deleted, updated, etc.—using a task management UI. The task management UI may be served as a web interface or standalone application, in various examples. The task management UI may be hosted within or be communicatively coupled to user matching system 102. Access to the task management UI may be managed according to authorized personnel. The task management UI may present a set of input UI elements to define a document intent. In some examples, the UI inputs correspond to fields in a document intent data structure, described further herein with respect to FIG. 4.

Document intents may also be suggested or determined by machine learning models. For examples, over a period of time, an unsupervised machine learning model (k-nearest neighbor, etc.) may ingest data from previously completed unlabeled documents. The data may include a description entered by an end user, output document type, end user telemetry data (e.g., steps taken within an application) leading up to the request, expert user activity in completing the document (e.g., what application functionality was used), etc.

The machine learning model may output clusters of unlabeled document intents. These document intents may be presented in the document management UI as possible new document intents. Then, each cluster may be labeled and/or altered by an authorized user.

Figure 4:
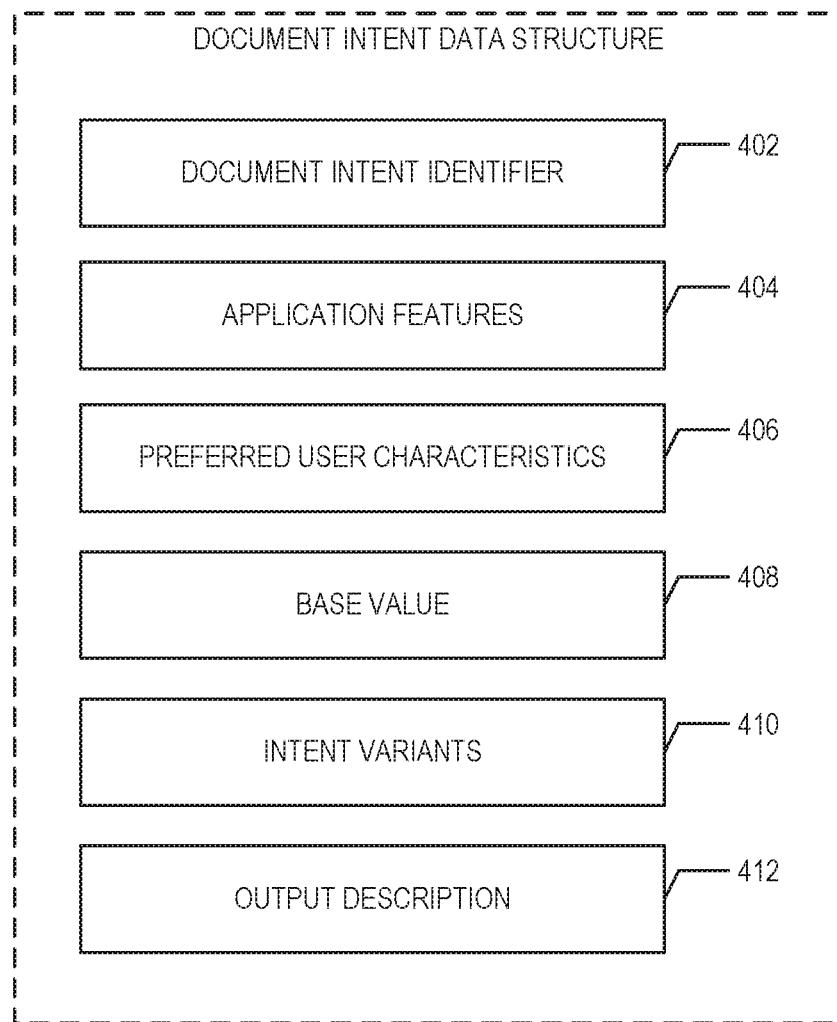
FIG. 4 illustrates a document intent data structure, according to various examples.

FIG. 4 illustrates a document intent data structure, according to various examples. FIG. 4 includes document intent identifier 402, application features 404, preferred user characteristics 406, base value 408, intent variants 410, and output description 412.

The underlying structure of a document intent may conform to a standardized format. For example, an XML Schema Definition (XSD) file may be used to indicate the various illustrated portions of a document intent structure as described above. When a new document intent is created, the document intent may be stored as an XML document conforming to the XSD file. Other file formats may be used without departing from the scope of this disclosure.

Document intent identifier 402 may be used for indexing and searching—for example, in database 128. Document intent identifier 402 may also be what is matched when determining a user's intent using processes described herein. For example, document intent identifier 402 may be "Resume" if the document is a generic resume document or "Executive Resume" if the document is a more specialized resume.

Application features 404 may identify a set of features (e.g., tasks) that may be needed to complete a document. As each document may likely be completed in a number of differing manners, application features 404 may identify a superset of features needed to complete the document. Application features 404 may have an importance rating (e.g., 1-5) signifying whether or not the feature is likely needed to successfully complete the document. Features may be grouped when only one of them is needed to complete the document (e.g., one of features A, B, or C).

Preferred user characteristics 406 may identify the characteristics of a user that may be relevant to complete the document. For example, user characteristics with respect to a user's application proficiencies, education level, availability (e.g., time periods available to work), and current/past job experience may be identified. As with application features 404, user characteristics 406 may have an importance rating.

Base value 408 may be a qualitative or quantitative value that represents the standard value for a document intent. For example, base value 408 may be a "$500", "high value", or '1'. Base value 408 may be used in calculating a personalized value for an end user that requests the document be completed. For example, if the end user needs the document performed in one day, a multiplier of '3' may be applied to base value 408. The resulting personalized value may be used in matching one or more expert users to the end user.

Intent variants 410 may identify data structures (e.g., by document intent identifier) for variants of the document intent. For example, one or more parent document intents and one or more child document intents may be identified. Thus, when the matching process is performed, the application features 404 and preferred user characteristics 406 may be retrieved from any identified parent document intents.

Output description 412 may include text that is presented to an end user or expert user that describes the document intent, and an expected output of the task. This may be used to confirm with the end user that the user matching system 102 correctly identified the document intent requested by the end user. The output description 412 may also include keywords associated with the document intent. The keywords may be the same as those presented to the end user, in some examples, Intent determination component 120 may be configured to match expert request 208 with one or more document intents as stored in database 128. Matching may be performed in a number of different ways and may be configurable by an administrator user. For example, text similarities algorithms such as longest common substring, Damerau-Levenshtein distance, Jaro, Jaro-Winkler, N-gram, cosine similarity, etc. may be used to determine a similarity score between expert request 208 and output description 412—or other text corpus for a document intent—of each document intent stored in database 128.

More complex techniques may be used to make a match that use additional signals beyond text similarity. These signals may include, but are not limited to, the application the request was made in, user characteristics of the end user, end user telemetry data (e.g., steps taken within an application) leading up to the request, a template selected by the user during creation of the document, and the current content of the document. The signals may be collected by signal collection 130.

These signals may be encoded for use in a previously trained machine learning model. The output of the machine learning model may indicate a probability score for each document intent. The higher the probability the more likely the expert request 208 is for that particular document intent. In another example, a weighted formula may be used based on one or more of the identified signals.

In some examples, the highest calculated score (text similarity or other more complex techniques) may be considered the match. In some examples, the document intents with the top (e.g., three highest) scores are presented to the user to confirm which of the document intents the end user actually meant in expert request 208.

Matching engine 116 may determine a set of potential expert users to complete the document once intent determination component 120 has determined a document intent. For example, the application features and preferred user characteristics of the document intent may be compared to ratings of expert users in expert pool 108. The ratings may be stored as part of the expert user's profiles be stored in user profiles 114. Preferred user characteristics of the document intent compared with the characteristics of the expert users may also be as a factor to determine the set of potential expert users. For example, if an expert user does not have the preferred education level, that expert user may not be included in the set of potential expert users.

Figure 5:
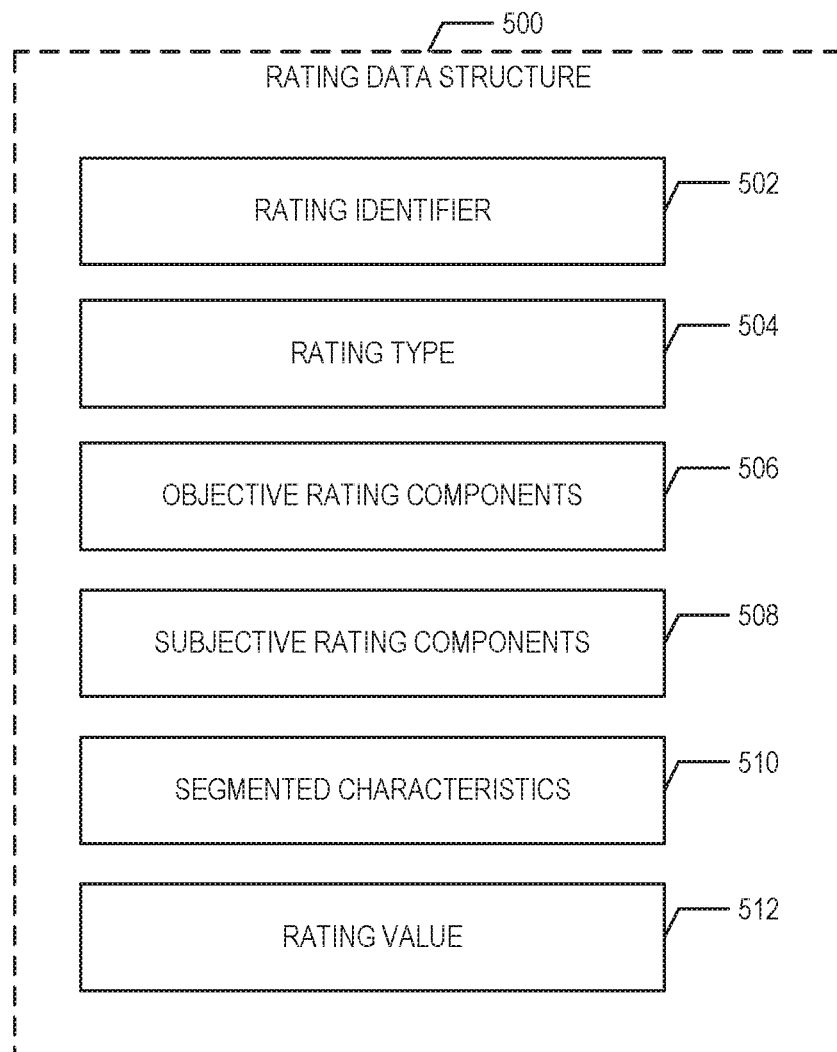
FIG. 5 illustrates a rating data structure, according to various examples.

FIG. 5 illustrates a rating data structure 500, according to various examples. FIG. 5 includes rating identifier 502, rating type 504, objecting rating components 506, subjective rating components 508, segmented characteristics 510, and rating 512.

The underlying structure of rating data structure 500 may conform to a standardized format. For example, an XML Schema Definition (XSD) file may be used to indicate the various illustrated portions of rating data structure 500 as described above. When a new rating data structure is created, the rating data structure may be stored as an XML document conforming to the XSD file. Other file formats may be used without departing from the scope of this disclosure.

Rating data structure 500 is illustrated as a generic rating data structure that may be used for multiple types of ratings. More specific rating data structures may also be used. For example, there be separate application proficiency and content editor rating data structures. In such cases, rating type 504 may not be needed.

Rating data structures may be managed—created, deleted, updated, etc.—using a rating management UI. The rating management UI may be served as a web interface or standalone application, in various examples. The rating management UI may be hosted within or be communicatively coupled to user matching system 102. Access to the rating management UI may be managed according to authorized personnel. The rating management UI may present a set of input UI elements to define a rating data structure. In some examples, the UI inputs correspond to fields in rating data structure 500.

Rating identifier 502 may indicate the name of the rating. The name be a function of rating type 504. For example, rating types may be for application feature proficiencies, overall application proficiency, document intent experience, ratings from other users, time to complete a task, among others. Accordingly, rating identifier 502 may be "pivot tables" and rating type 504 may be "feature proficiency."

Ratings may be objective in that the measurement originates from a trusted third-party or is quantitative in nature. In contrast, subjective rating components 508 may originate from other users and be qualitative in nature. If the rating originates from a user—even if the rating is a number—as opposed to measured application data, etc., the rating may be considered subjective.

Objective rating components 506 may include measurements of data related to the type of rating. For example, if rating type 504 is for application feature proficiencies, objective rating components 506 may include the number of times a feature has been used, the frequency the feature has been used, certification from third parties related to the feature, job history, education level, obtained degrees, closeness to meeting an estimated budget, among other things.

Subjective rating components 508 may include ratings given by human users related to the type of rating. For example, there may be a quality rating of an application support page attributable to a user. In such an instance, rating identifier 502 may include the name of the support page or a name of feature of an application that the support page is for. Another subjective rating may be an overall rating for an expert user with respect to how helpful the expert user was in assisting an end user. For example, after completing a document, the end user may be given the opportunity to rate how helpful the expert user was (e.g., a 1-5 rating). Similarly, the expert user may give a rating to the end user.

Segmented characteristics 510 may be used for more granular ratings. A segmented characteristic may be a rating type. For example, a user may have a helpfulness rating for users with high proficiency in application and a different helpfulness rating for users with a low proficiency in the application. As another example, a user may have different helpfulness ratings based on an age of the end user requesting help. Another segment may relate to the cost to complete a document. For example, a particular expert user may be rated highly when being paid above $100 but have a lower rating when being paid less than $100.

Rating value 512 may include a value representing rating identifier 502 for rating type 504 and segmented characteristics 510, if applicable. The value may be quantitative or qualitative in nature. Rating 512 may be calculated based on the values included in objecting rating components 506 and subjective rating components 508 for a particular rating. For example, a weighting formula may be used for the various components such as (0.2)(objective rating 1)+(0.3)(objective rating 2)+(0.5)(subjective rating 1). The formula and weights may be stored with within rating data structure 500 and may editable by an administrator user.

Signal collection 130 may be used to obtain data for objecting rating components 506 and subjective rating components 508. The signals may come from within user matching system 102 or applications managed by user matching system 102 as well as external sources. External sources may include, but are not limited to, personal or professional social networks, accreditation services, third party data aggregators, etc.

An external source may be accessed using a variety of means. For example, an external source may provide an API that enables the user matching system 102 to specify a user identification. In response to the API call, the external source may format a response data package with data associated with the user identification. The information may include proficiency ratings for applications, application features, profession data such as current job title, and the like. The information may be stored as user characteristics or ratings within a user profile.

In another example, user matching system 102 may access the external source using user provided credentials (e.g., as stored in a user profile data structure) to act as the user. Then, user matching system 102 may use screen scraping techniques, as are known in the art, to retrieve information such as technical proficiency ratings, from the external source.

Data retrieved from an external source may be transformed to a format consistent with an ontology used by user matching system 102. For example, a professional social network may have skills a user can enter into the user's profile. A data map—as stored in user matching system 102—may identify a mapping between the skills of the social network and user characteristics of a user profile data structure. Accordingly, when retrieving data from the social network, the map be queried to obtain the ontology terminology (e.g., a feature rating or application proficiency) for the skill. The mapping may also identify a scale to use (e.g., 50% to a 2 rating).

Figure 6:
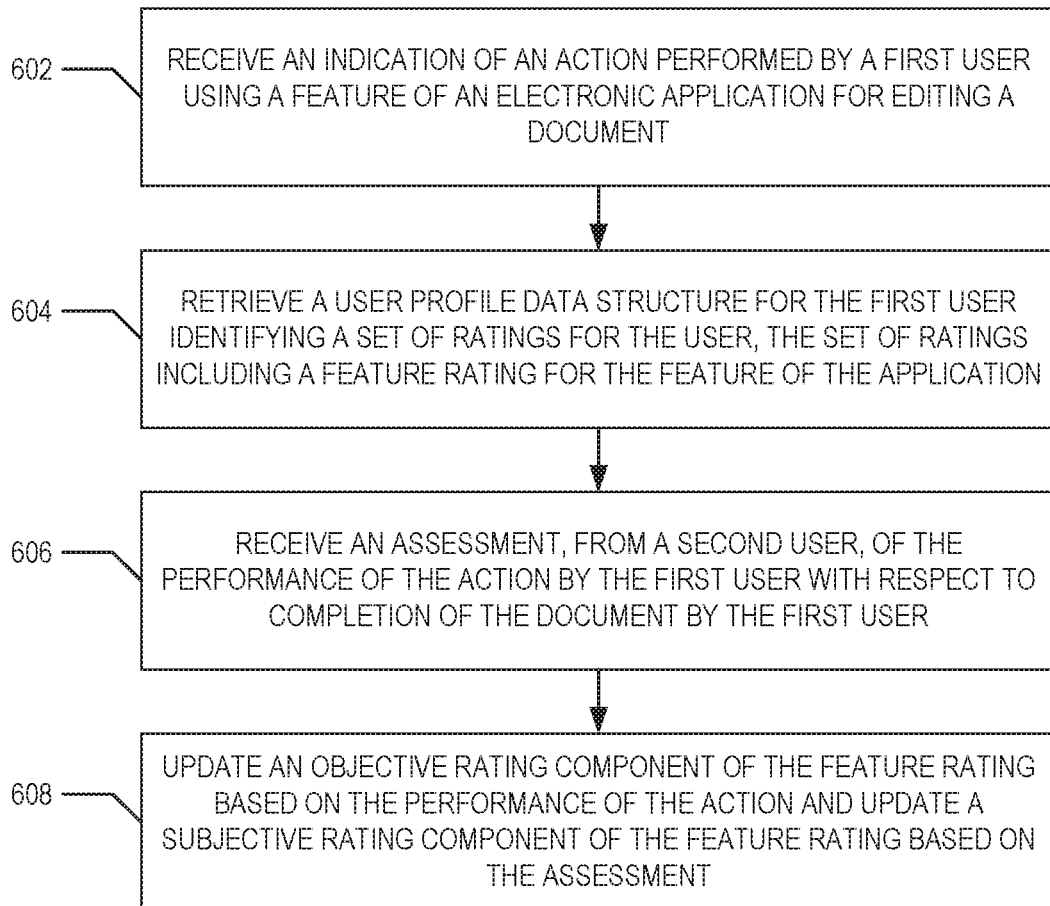
FIG. 6 is a flowchart representation of a method to update a feature rating, according to various examples.

FIG. 6 is a flowchart representation of a method to update a feature rating, according to various examples. The method may be embodied in a set of instructions stored in at least one computer-readable storage device of a computing device(s). A computer-readable storage device excludes transitory signals. In contrast, a signal-bearing medium may include such transitory signals. The computing device(s) may have one or more processors that execute the set of instructions to configure the one or more processors to perform the operations illustrated in FIG. 6. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 602, in an example, an indication may be received of an action performed by a first user using a feature of an electronic application for editing a document. In an example, the indication is received at or within a system such as user matching system 102.

The indication may include receiving or accessing a log of the activities performed by the first user with respect to the application. For example, the log may be a data store with telemetry data of actions taken by users within applications. The actions may be associated with a user ID, a time the action was taken, an application identifier, etc. Accordingly, the data store may be queried to obtain what activities the user has taken with respect to the feature of the application to receive the indication of the first user using the feature of the application.

The log may also identify actions taken by the first user with respect to the feature that are not direct uses of the feature. For example, a knowledge repository may store content related to features of applications. The first user may have created an object, such as written content, with respect to the feature of the application.

At operation 604, in an example, a user profile data structure may be retrieved for the first user. The user profiled may identify a set of ratings for the user including a feature rating for the feature of the application. The user profile data structure may be defined according to a defined schema. In an example, a database may be queried using a user id of the first user to retrieve the data structure. A feature rating may include subjective and objective components.

At operation 606, in an example, an assessment may be received, from a second user, of the performance of the action by the first user with respect to completion of a document by the first user. For example, the first and second user may have completed a collaborative editing session with respect to the document. Completing the document may have involved the first user using the feature (e.g., creating a pivot table, formatting headers in a presentation document, etc.). A prompt may be presented to the second user, within the application, to assess the first user's performance with respect to the completed document. Reciprocally, the first user may give a rating to the second user. A user profile of the second user may be updated based on the rating.

At operation 608, an objective rating component of the feature rating may be updated based on the performance of the action. For example, the objective rating may be the number of times the first user has used the feature. A subjective rating component of the feature rating may be updated based on the assessment. For example, the rating may be averaged along with other previous assessments. In some instances, a higher weight may be given to recent (e.g., the last ten) performances of the feature.

In various examples, multiple versions of the feature rating are stored for the first user. The multiple versions may be segmented according to user characteristics (e.g., age, education level, application proficiency). For example, user characteristics of the second user may be accessed by retrieving the user profile for the second user. The user characteristics may include an age of the second user. Based on the age, a version of the feature rating from the multiple versions of the feature rating in accordance with the age of the second user may be updated. The ratings may also be segmented based on cost. For example, a user may have a first rating for document completion costs at a first price range and a second rating the document completion costs at a second price range.

The method may additionally include accessing a user identification for the first user with respect to an external source of data such as a third-party data store. The third-party data store may be a social network with application feature proficiency ratings. A rating request may be transmitted to the third-party data store using user identification of the first user. Based on a response message from the third-party store, the first feature rating may be updated. For example, an objective rating of the feature may be updated by averaging the rating with other received signals.

In an example, a rating of written content may be received by a third user. For example, a written content a UI element may include an option to give a helpfulness rating to the written content. The feature rating may be updated based on the rating of the written content by the third user. For example, one of the subjective components of the feature rating may be updated.

In an example, a collaborative editing session may be established with respect to another document, over a network connection, between a third user and the first user based upon the feature rating and availability of the first user. For example, user matching system 102 may track whether or not the first user has been or is working with another user before making a match with the third user. The collaborative editing session may be established based on a match between the first user and third user. A match may be made using a method such as described with respect to FIG. 7.

In some examples, objective rating components for various features of the application used by the first user may be updated based on the established collaborative editing session. For example, the total number of times the first user has used a feature may be updated.

Figure 7:
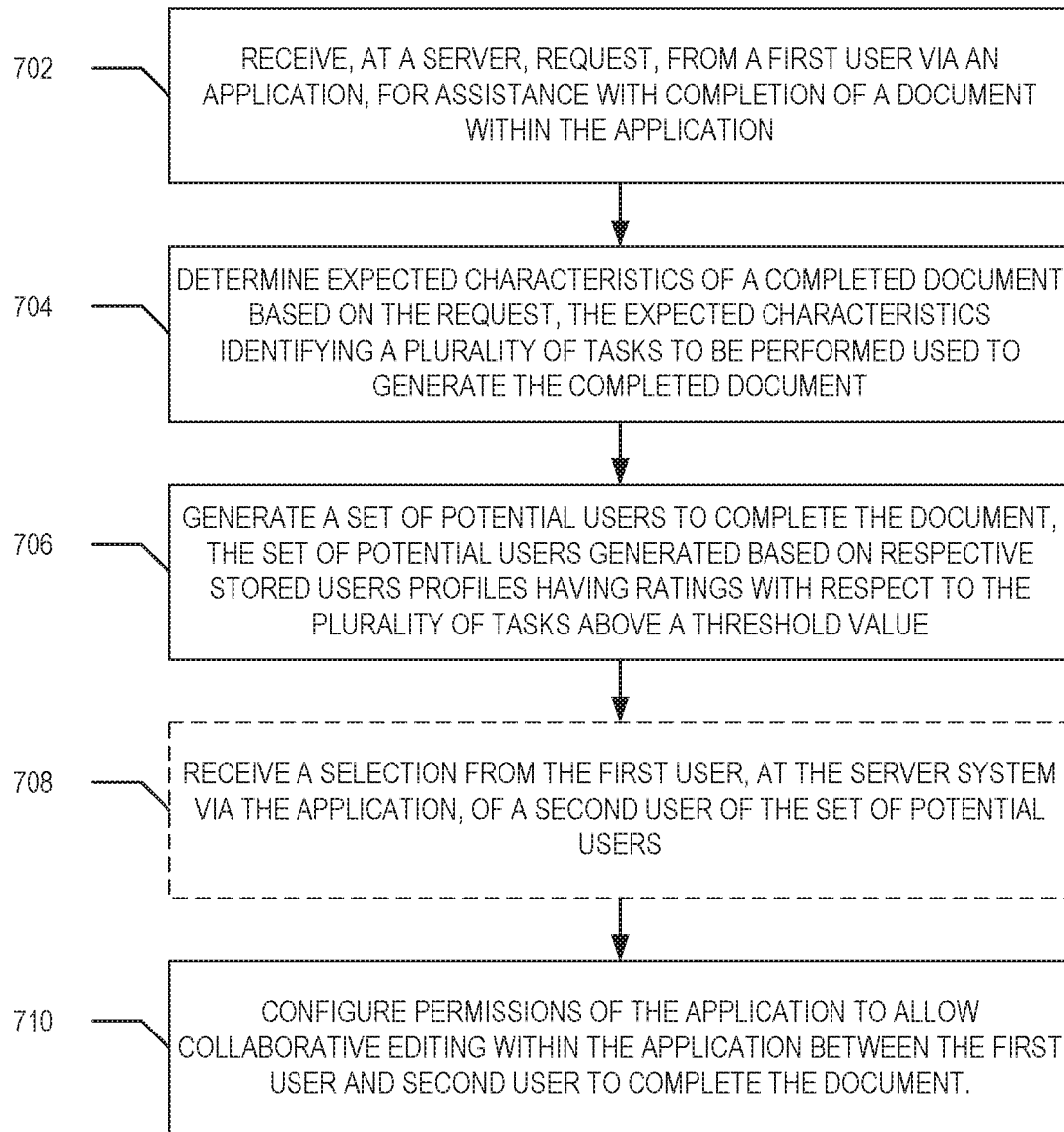
FIG. 7 is a flowchart representation of a method to match a first user with a second user, according to various examples.

FIG. 7 is a flowchart representation of a method to match a first user with a second user, according to various examples. The method may be embodied in a set of instructions stored in at least one computer-readable storage device of a computing device(s). The computing device(s) may have one or more processors that execute the set of instructions to configure the one or more processors to perform the operations illustrated in FIG. 7. A computer-readable storage device excludes transitory signals. In contrast, a signal-bearing medium may include such transitory signals. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 702, in an example, a request is received from a first user via an application. In an example, the request is received at a server. The request may be for assistance with completion of a document within the application. The server may be user matching system 102. The request may include an identifier of the first user. The identifier may include a domain (e.g., user@company.com where company.com is the domain). The application may be executed locally on a client device of the first user or via webpage on the client device.

At operation 704, in an example, expected characteristics of a completed document are determined based on the request. The determination may be made using component of user matching system 102 such as intent determination component 120. The expected characteristics may identify a plurality of tasks to be performed to generate the completed document. In an example, the characteristics are determined based on data, entered by the user in the application in conjunction with the request (e.g., questions 302). The characteristics may also be based on telemetry data of the first user leading up to the request.

The expected characteristics may be based on calculating a probability that the request is for a completed document with a first intent of a plurality of document intents. For example, intent determination component 120 may compare words in the request with descriptions of document intents. Other probability-based scores may be used as described previously. In some examples, a number (e.g., three) of the higher probability document intents are presented to the user to confirm the document intent.

In an example for the chosen or determined document intent, a document intent data structure is retrieved. The document intent may identify the plurality of tasks. The tasks may be features of the application that may be needed to be known to complete the document per the request.

The expected characteristics may include expected content of the completed document and completion preferences for the completed document and wherein generating a set of potential users is further based on the expected content and completion preferences. The expected content may be based on a description of the request entered in response to one of questions 302. The expected content may be used as one of the factors in determining the document intent. Completion preferences may be used as a factor in matching the first user with the second user as discussed further in operation 706.

At operation 706, in an example, a set of potential users to complete the document may be generated. The set of potential users generated may be based on respective stored user profiles having ratings with respect to the plurality of tasks above a threshold value as well as availability of the potential users given an expected time to complete the document. Consider that user matching system 102 iterates or queries a data store of user profiles (e.g., user profiles 114 or database 128) for a set of user profiles. The query may include initial limiting factors to decrease the processing power and energy use needed to search through all of the user profiles. For example, the search may be limited to potential user profiles that have the same domain as the first user. This may be useful so that the first user will end up working with an expert user that is part of the same company or organization as the first user. This has the additional benefit of reducing privacy concerns with sharing information with an outside expert.

Another filter may to only look at user profiles in which a rating data structure exists for each of the plurality of tasks. If a particular user profile does not have a rating data structure then it is unlikely that the particular user profile will be a good match for the first user. To this end, the method of FIG. 7 may include retrieving the stored user profiles for a set of potential users. Then for each respective user profile of the set of potential users: (1) determining that the respective user profile identifies a respective rating data structure for each of the plurality of tasks; and (2) calculating a match score for the respective user profile, with respect to the request from the first user, based on ratings identified in the rating data structures. The match score may be calculated in a variety of manner including but not limited, a weighted average of the ratings and a sum of the ratings.

In some instances, a rating data structure may include segmented ratings based on a user characteristics. For example, a user may have one rating for based on interactions with 20-30 year old males and another for interactions with a 30-40 year old females. Accordingly, user characteristics of the first user may be used to retrieve a rating from the respective rating data structure associated with the user characteristics of the first user. The user characteristics of the first user may be stored in a user profile of the first user.

In some examples, after the match score has been calculated based on the ratings, additional factors may be used to narrow the set of potential users. For example, the completion preferences may be used to remove some users from the set of potential users. Consider that the set of completion preferences includes a due date and an expected cost. The completion preferences may be compared to information in the set of user profiles of the set of potential users. The information may include preferences of the users with respect to cost and timeliness. In some examples, a request may be transmitted from user matching system 102 to computing devices of the potential users to determine the preferences. Based on the profiles and responses, the set of potential users may narrowed to remove users that cannot meet the completion preferences.

In some examples, the set of potential users (narrowed or otherwise) may be presented to the first user. Presenting may include an indication of when each of the potential users may complete the request, the expected cost, and background information (e.g., education, proficiency levels) on each of the potential users. The presentation may be in the same application as the request. The application may permit the first user to select one of the potential users as a second user. At operation 708, the selection may be received at the server of the second user.

At operation 710, in an example, permissions may be configured of the application to allow collaborative editing within the application between the first user and a second user of the set of potential users to complete the document. For example, each document may have an identifier and a list of authorized users stored within user matching system 102. Upon received the selection of the second user, the server may update the list of authorized users for the document within database 128. Then, the second user may be granted access to edit the document at the same time as the first user. In some example, a chat session is initiated between the first and second users facilitated by user matching system 102 using techniques known in the art. In some examples, the users may chat within the application (e.g., use a sidebar interface).

After the document has been completed the first and second users may rate the other. In the case of the second user, a rating data structure within the user profile of the second user with a task of the plurality of tasks may be updated based on a received rating from the first user. For example, if the second user had to generate a pivot table and a chart, the ratings for the pivot table and chart generation may be updated (e.g., averaged with existing ratings). In some examples, the rating may only be updated with respect to the application.

A rating for the first user may updated based on a rating from the second user. This rating may reflect the promptness in paying by the first user, the clarity of the request, or other factors. The rating may be used by expert users to decide if he or she wants to work with the first user.

In some examples, a more accurate match may be based on a document value. A document value may be expressed in a variety of forms including a numerical rating, a qualitative rating, a user-specific rating, a dollar value, or a relative value. An input to determining the document value may come from the intended audience of the document. Further explanations of these ratings are discussed in the context of FIG. 8.

Figure 8:
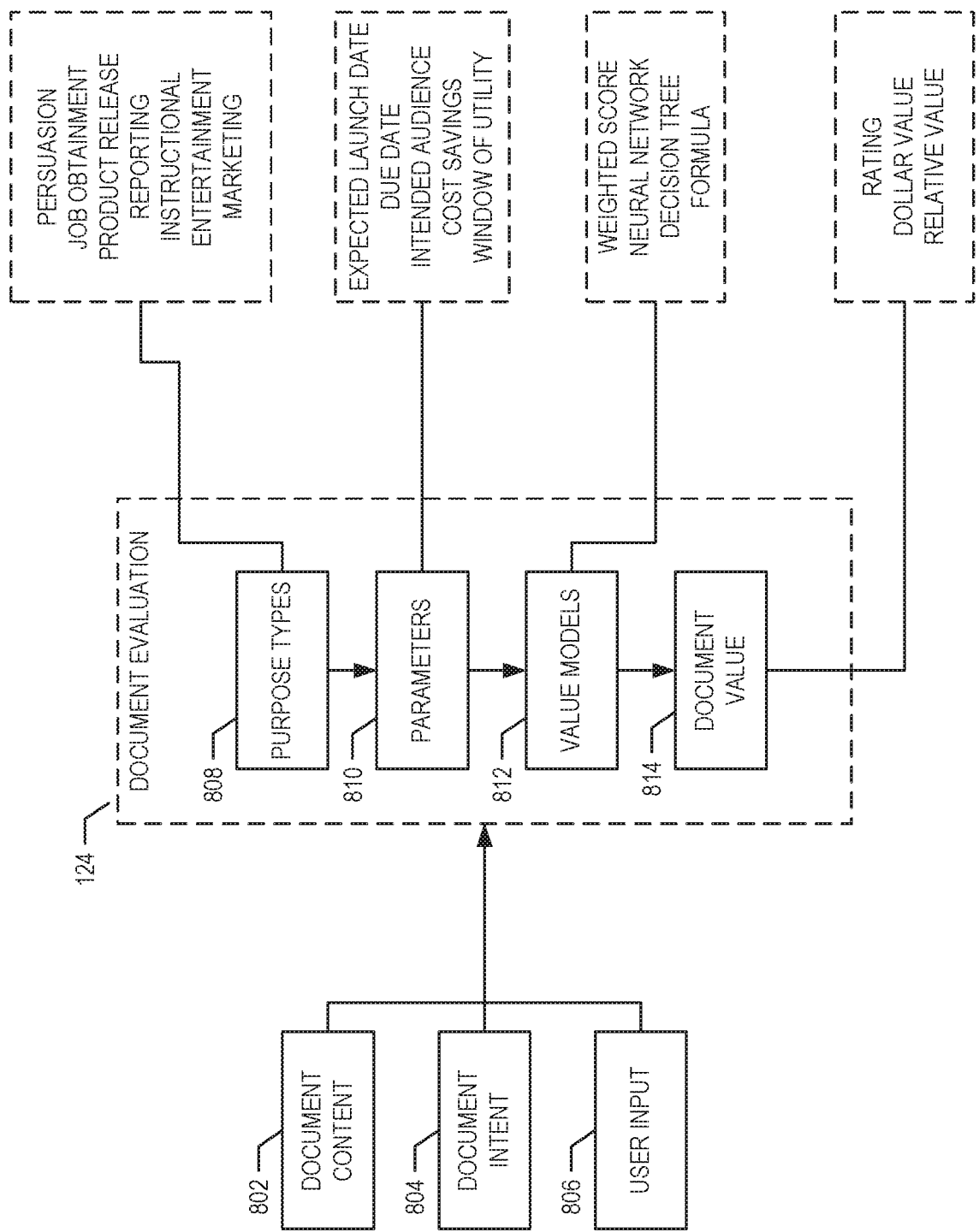
FIG. 8 is schematic diagram illustrating determining a document value, according to various examples.

FIG. 8 is schematic diagram illustrating determining a document value, according to various examples. FIG. 8 includes document evaluation 124 that includes purpose types 808, parameters 810, value models 812, and document value 814. Inputs to document evaluation 124 may include document content 802, document intent 804, and user input 806. Document evaluation 124 may be part of a larger matching system such as user matching system 102 or operate as a standalone service/system.

Documents may be created for a number of purposes. For example, a resume is often created for a single purpose, applying for a new job. However, other documents of a similar/same structure may have different purposes. For example, a sales report may be used for marketing in one instance, and for decision making by a production team in another. Similarly, a presentation may be used to secure funding for a company or as part of a motivation speech. As used herein, purposes are referred to as purpose types (e.g., purpose types 808) and include, but are not limited to, persuasion, job obtainment, product releases, reporting, instructional, entertainment, marketing, and capture/recording. A document is not limited to one purpose type.

Document evaluation 124 may determine a purpose type(s) for a document. The document may have just been created or may include document content 802. As a starting point, document evaluation 124 may use one or more of document content 802, document intent 804, or user input 806 to determine one or more purpose types. A purpose type may be represented as a purpose type data structure stored in a database (e.g., database 128). The purpose type data structure may be defined according to a schema with fields such as a purpose type identifier, keywords, and parameters.

The purpose type identifier may be a name of the purpose type (e.g., persuasion, marketing, etc.). Keywords may be words of phrases associated with the purpose type. Prior completed semantic analysis of labeled data sets may yield sets of words associated with the different purposes types. Additionally, writing styles and word frequency may be associated with different purpose types. For example, academic papers (e.g., an academic domain) may use certain words at a different frequency than marketing brochures.

Document content 802 (e.g., text in a word document, column headings in a spreadsheet) may be analyzed to determine a writing style, keyword frequency, domain, etc. Thus, in an example, if document content 802 indicates an academic domain, the purpose type may be considered instructional. Various text similarities algorithms such as longest common substring, Damerau-Levenshtein distance, Jaro, Jaro-Winkler, N-gram, cosine similarity, etc., may be used in comparing document content 802 with the keywords or phrases identified in purpose type data structure. The output of the algorithms may be a percent similarity match.

The parameters in a document type data structure may identify one or more parameters 810. In an example, parameters 810 are the variables used to calculate a document value. The parameters may be, but are not limited to, an expected launch date of a product, a due date, an intended audience, a cost savings, a window of utility, expected health benefits, etc. Not every document will have values for each of the parameters. For example, a student's resume may not have a quantifiable health benefit. In contrast, health benefits may be readily apparent with respect to a presentation to obtain funding for researching a new cancer treatment.

Document evaluation 124 may also use document intent 804 as a signal for determining a purpose type. Document intent 804 may be determined by intent determination component 120 as described previously. In some instances, a document intent may correspond directly with a purpose type. For example, if the document intent was for a student resume, the purpose type may be job obtainment. Whereas, if the document intent was generating a sales report, the purpose type may not be precisely known; however, it may be assumed that a job obtainment purpose type is less likely than the reporting or marketing job purpose types.

A mapping table may be stored that links document intents to purpose types. The mapping table may include weights for the purpose types. For example, the sales report document intent may include a weight of 0.1 for job obtainment and a 0.9 for a reporting purpose type.

The probability that any particular purpose type is the purpose of a document may be calculated based on component scores. One component score may be the probability that document content 802 matches the purpose type. Another component may be the weight given to a purpose type based on document intent 804. The two component scores may be added together, averaged, or be given separate weights. For example, there may be a 90% match between document content 802 and the persuasion purpose type, and a 0.7 weight for the persuasion purpose type based on document intended 804. The final probability may then be calculated as 80%. The highest probability may be considered the purpose type for a document.

User input 806 may be used to augment or a supplant a purpose type determined using the probability method above. For example, within the application the user is requesting help from, a drop-down menu may be presented. The menu may include options for selecting a purpose type. The menu may be presented as part of a series of questions 302 with respect to FIG. 3. Using this method, document evaluation 124 may not require other inputs such as document content 802 or document content 804.

In other examples, document evaluation 124 may perform the profitability analysis described above to match one or more purpose types. Any purpose type that is above a threshold probability (e.g., 60%) may be presented to the user that has requested help. The user may then select the purpose type that most closely aligns with the user's goals with respect to the completed document.

Other methodologies may be used to determine the purpose type of the document. For example, a machine learning model (e.g., a neural network) may be built, trained, and used for determining purpose types. Features obtained from document content 802, document content 804, and user telemetry data with respect to actions taken by the user leading up to the request may be used to train machine learning model.

Past known purposes may be used as training data. For example, a training data set may include vector representations of text in the document and encodings representing a document type (e.g., presentation, spreadsheet), telemetry data, quantity of prior documents (e.g., the user has completed 20 sales document with X intent), and user characteristics. Each item in the training data set may be labeled with the prior determined purpose type.

The trained machine learning model may be used to determine purpose types of a document. For example, document evaluation 124 may encode vector representations of text in a document, encodings representing a document type (e.g., presentation, spreadsheet), telemetry data, and user characteristics for a recently received document completion request. The output of the machine learning model may be the probability that each purpose type is the actual purpose type for a user. In some instances, a user may be presented with the highest probability purpose type for confirmation. The results of the confirmation may be used to further train the machine learning model.

In some sense, all documents have a value. For example, even a static document that is never shown to anyone beyond the creator has an economic cost to store, transmit, and display the document. After deleting the document, the document value goes to zero. Or, if the document has a recreation cost, the value of the deleted document may now be negative. Accordingly, a document's value may be driven by the expected economic outcome of the document achieving its purpose (e.g. to persuade, summarize, capture, etc.). For example, a resume that effectively persuades someone to hire you for a six-figure job has a value which is very different than the recorded meeting notes for a routine team meeting.

Different value models 812 may be used in order to generate document value 814. Document value may be expressed as a dollar value, a rating (e.g., 1-X), or a relative value (e.g., high, medium, low). The relative value may be a user-specific value for a given document intent and purpose type. For example, resume creation for an executive position at a new company may be of greater importance to the user than the same resume creation for a part-time job.

Document evaluation 124 may use a value model to calculate document value 814 using parameters 810 as input variables. Consider the following examples in which document value 814 is expressed as a dollar value. The selected parameters may include a quality or preservation of life ($P_{oL}$), a financial outcome (FO), a window of utility ($W_{oU}$), a deadline ($\beta$), and an intended audience. As seen below, the value of a particular parameter may be based on another parameter.

In an example, quality or preservation of life is considered the highest value that a document may provide. Consider that the document a formula for a life-saving prescription drug or battle plans that will reduce casualties in war, etc. The value model used in determining the document value may be configured such that any increase in $P_{oL}$ outweighs all other parameters.

The FO parameter may be linked to a quantifiable financial outcome. Example financial outcomes may be: a startup's pitch deck to persuade (e.g., the persuasion purpose type) investors to give the startup $10 M in funding; a book that teaches Italian cooking which the author expects to sell 10,000 copies; or a financial model that summarizes the projected savings from a proposed merger.

In some cases, a document has a limited utility period that dictates how long the contained information has value. This may be referred to as the Window of Utility ($W_{oU}$). For example, a weather report for the weekend has value leading up to the date in question, but quickly erodes once the new week begins. In contrast, a document teaching someone how to play classical violin has a very broad window of utility because people have been playing music for a long time and will likely continue doing so. In some instances deadline ($\beta$) is used—after which point the $W_{oU}$ goes to zero.

A formula value model to calculate document value 814 (DV) may be defined as:

$$DV = [[(\alpha \times P_{oL}) + FO] \times W_{oU}]$$

where
- $P_{oL}$ defines the number of lives preserved by the information in a completed document
- α is a scale factor for ($P_{oL}$) ranging from 0.0 for no human life impact to ∞ if human life is affected. In some examples, the largest number a computing system used to calculate DV is capable of representing may be used in lieu of ∞.
- FO is an expected financial outcome of the document where FO is defined as:

$$\sum_{k=0}^{n} networth(k)$$

That is, the primary determinant in FO may be the sum of the estimated net worth for all N consumers (e.g., viewers) of the completed document
- $W_{oU}$ is the Window of Utility ranging from 0.0 to 1.0 and may evaluated as IF(currentDate<=deadline β) THEN $W_{oU}$=1; ELSE $W_{oU}$=0

In some example, documents without a deadline are defined by a β=∞

Next, a series of examples are presented using the above value model. In example 1 there is a formula for a life-saving prescription drug that can help one million people. Thus, $DV=[[(1\ M\times\infty)+FO]\times 1.0]=>1\ M\infty$.

In this example, the mere fact that this formulation can save 1 M lives without a defined deadline means the information is very valuable worth much more than the combined net worth of the recipients of the prescription drug. Further, another prescription that could save 10 M lives would similarly be very valuable but have a worth ten times greater than this formula.

In example 2, the document may be for a battle plan that can save 100 K lives if reviewed and executed within the next ten days. Thus, $DV=[(100\ k\times\infty)+FO]\times 1.0]=>100\ K$ if reviewed and executed within 10 days $DV=[(100\ k\times\infty)+FO]\times 0.0]=>0$ because the deadline β has passed and now the document is worth nothing In example 3, a document may be a startup's pitch deck to persuade investors to give the startup $10 M in funding at a meeting on March 15th. Assume that the intended audience is five venture capitalist decision makers with an estimated net worth of greater than 1 billion million each, in this case, if the document is finished and reviewed before March 15th:

$DV=[[(P_{oL}=0)+\Sigma_{k=0}^{n}networth(k)=\$5\ B]\times 1.0]=>\$5\ B$ if finished and reviewed by March 15$^{th}$ However, after the March 15$^{th}$ meeting, the document value becomes 0

$DV=[[(P_{oL}=0)+\Sigma_{k=0}^{n}networth(k)=\$5\ B]\times 0.0]=>\$0$

In example 4, the document may be a book that teaches Italian cooking which the author expects to sell 10,000 copies. Assuming that the average net worth for an American is 301 k, the sum of the net worth is 301 k×10 k=>$3 B and $DV=[[(P_{oL}=0)+\Sigma_{k=0}^{n}networth(k)=\$3\ B]\times 1.0]=>\$3\ B$ Notice, that when example 3 is compared to the previous example, it would suggest that a document which is intended to secure $10 M in VC funding is worth more than a cookbook that sells 10 K copies as an objective measurement. Flipping the example around, if the book's purpose was to entertain and served a broader audience—selling an expected 10 M copies then the document value may be $3 T. For example, the Harry Potter series is an example of this category where every one of the seven books in the series sold more than 10 M copies. Thus, one of these books would have more economic value than the startup pitch deck example above.

The values for parameters used in a value model may be obtained in a variety of manners. In some instances, the parameters may be requested directly from the user. For example, after determining the purpose type—either automatically or by soliciting the user—the application may present questions to user for parameters associated with the purpose type. Accordingly, if the purpose type is for a product launch, the application may request the launch date of the product. This may be used as deadline β in calculating a document value.

In some examples, user matching system 102 may obtain the values for the parameters using API calls or querying internal databases. Consider Example 3, where there is a meeting on March 15. User matching system 102 may access a calendar of the user that is presenting at the meeting—with the permission of the user—to retrieve an attendee list for the meeting. Characteristics (e.g., net worth, job title, etc.) may be gathered using identifiers of the attendees (e.g., e-mail addresses). For example, a social media website or other external data repository may be queried using the identifiers to retrieve the characteristics. In some example, permission for the data retrieval is obtained from attendees before the characteristics are retrieved.

The formula value model above is only an example and other formulas may be used. For example, more of fewer variables may be used in determining a document value. The variables may include the importance of a document (e.g., on a rating or 1-5) as input by the user, the amount the user is willing to pay to complete the document, the time it takes to complete the document (e.g., more time may mean more value), the economic value (e.g., salary) of the creator and intended audience, among others.

Another variable may be a reuse score based on the potential for a document (or a section within the document) to be reused. For example, if the document is a template that will be used as the basis for all company presentations in the future, the document may have a higher value. Similarly, a chart that may be placed in many presentations or documents may be given a higher reuse score.

A weighted score may be a type of a formula value model that results in a document value between zero and one: with one being considered high value and zero, low value. Other weights scored may have an open ended range. Each of the parameters used in calculating the weighed score may be scaled to a standardized range if a set range for the document value. A decision tree value model may be stored as a set of if-then statements. For example, "if(due-date==true) and if (due-date<=one-week from today) then document value=5." Different formula value models may be stored in value models 812. A weighed score may be used in place of or in conjunction with other value values such as the detailed formula model described above.

A trained neural network (e.g., one or more layers of nodes) may be used to determine a dollar value range or relative value for a document. The neural network may be trained using values associated with document value determinization using previously completed documents. A trained neural network may be stored as a set of weights for each node in each layer of the neural network. For example, labeled high value, low value, etc.—data sets of parameters may be encoded as a feature vector as the input to the neural network.

Accordingly, after training, document evaluation 124 may input the parameters values for a newly received request into a feature vector. The parameter values may be obtained as described above. The output of the neural network may be a probability that each value range or relative value is the "correct" value. For example, there may be an 80% chance the document value is "high" and a 20% chance the document value is "low." In some examples, training may occur periodically for a given document as the document value may change over time based on the audience increasing. For example, if a document is initially viewed by five people (e.g., in the first week) the document value may be low; however, if the document is used 50 k times over the next three months, the document value would be higher.

The formulas, neural networks, decision tree structures, and weighted score definitions for calculating a document value may be stored in value models 812.

Figure 9:
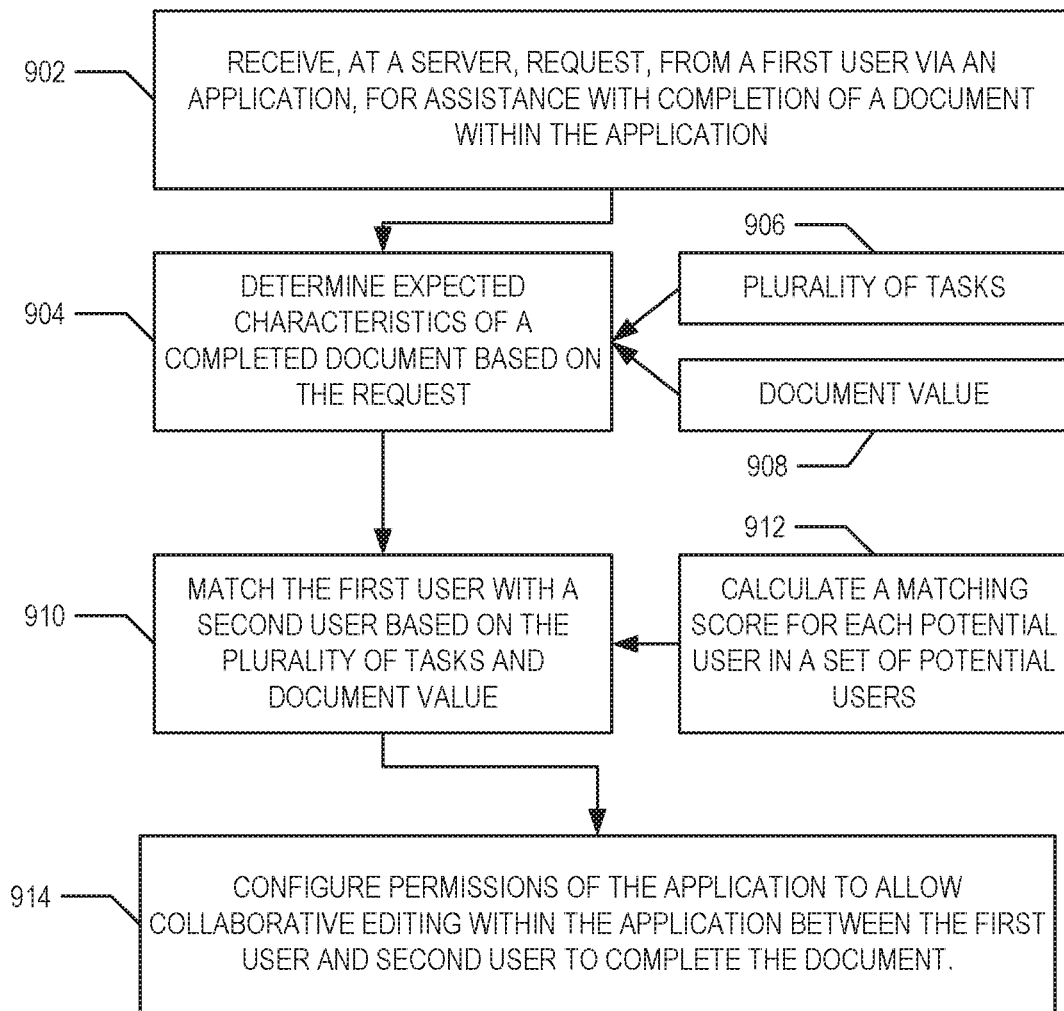
FIG. 9 is a flowchart representation of a method to match a first user with a second user, according to various examples.

FIG. 9 is a flowchart representation of a method to match a first user with a second user, according to various examples. The method may be embodied in a set of instructions stored in at least one computer-readable storage device of a computing device(s). A computer-readable storage device excludes transitory signals, in contrast, a signal-bearing medium may include such transitory signals. The computing device(s) may have one or more processors that execute the set of instructions to configure the one or more processors to perform the operations illustrated in FIG. 9. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 902, in an example, a request is received from a first user via an application. The request may be received at a server. The request may be for assistance with completion of a document within the application. The server may be user matching system 102. The request may include an identifier of the first user. The identifier may include a domain (e.g., user@company.com where company.com is the domain). The application may be executed locally on a client device of the first user or via webpage on the client device.

At operation 904, in an example, expected characteristics of a completed document are determined based on the request. The determination may be made using component of user matching system 102 such as intent determination component 120. The expected characteristics may identify a plurality of tasks (906) to be performed to generate the completed document. In an example, the characteristics are determined based on data entered by the user in the application in conjunction with the request (e.g., questions 302). The characteristics may also be based on telemetry data of the first user leading up to the request.

The expected characteristics may also include a document value (908) for the completed document. A document value may be based on a number of parameters and a value model as described above with respect to FIG. 8. For example, one of the parameters may be an intended audience for the completed document. Characteristics (e.g., job titles, income, net worth, etc.) of the intended audience may be retrieved. Retrieval may include querying a database or invoking an API call. The retrieved characteristics may be used as parameters in calculating the document value. In some examples, the determined document value may be presented to the first user.

In an example, a type of purpose for the completed document is determined. The purpose may be intended or unintended. The type of purpose may be determined by document evaluation 124 as discussed in detail with respect to FIG. 8. For example, the document content, a document intent, or user input may be used to determine the purpose type. Purpose types may be stored as data structures. The data structure may identify a set of parameters used to calculate the document value based on the purpose type.

For example, if the determined type of purpose is a persuasion purpose, a selected set of parameters may include roles (e.g., decision maker, investor) of an intended audience of the completed document. Each role may have a quantifiable value used in a formula for calculating the document value. In another example, the determined type of purpose may be a marketing purpose and the selected set of parameters may include an estimated launch date for a product.

At operation 910, in an example, a computer-implemented matching process is performed to match the first user with a second user based on the plurality of tasks and document value. For example, as discussed in operation 706 in FIG. 7, each potential user may have ratings with respect to the plurality of tasks. Each potential user may also have a rating with respect to a document value. Thus, a user may have a "high" rating for relatively low documents values (e.g., the bottom 20% of a defined scale), but a "low" rating for relatively high document values (e.g., the top 20%). Accordingly, at operation 912, a matching score may be calculated for each potential user using the ratings for the plurality of tasks and the document value (e.g., using a neural network, weight score formula, etc.). The potential user with the highest matching score may be selected to work on the document with the first user. In some examples, the top three matched potential users are presented to the first user for final selection.

In an example, the document value may be based on an estimated time of completion of the document for each potential user. As described previously, a document value may change over time. Consider a first potential user can complete the document in one day and a second potential user needs two days. Accordingly, the document value may be higher for the first potential user than the second potential user. Thus, depending on the weights used in a matching score, the first potential user may be selected even if the first potential user has lower ratings than the second potential user with regards to the plurality of tasks.

At operation 914, in an example, permissions may be configured of the application to allow collaborative editing within the application between the first user and a second user of the set of potential users to complete the document. For example, each document may have an identifier and a list of authorized users stored within user matching system 102. Upon received the selection of the second user, the server may update the list of authorized users for the document within database 128. Then, the second user may be granted access to edit the document at the same time as the first user. In some example, a chat session is initiated between the first and second users facilitated by user matching system 102 using techniques known in the art. In some examples, the users may chat within the application (e.g., use a sidebar interface)

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
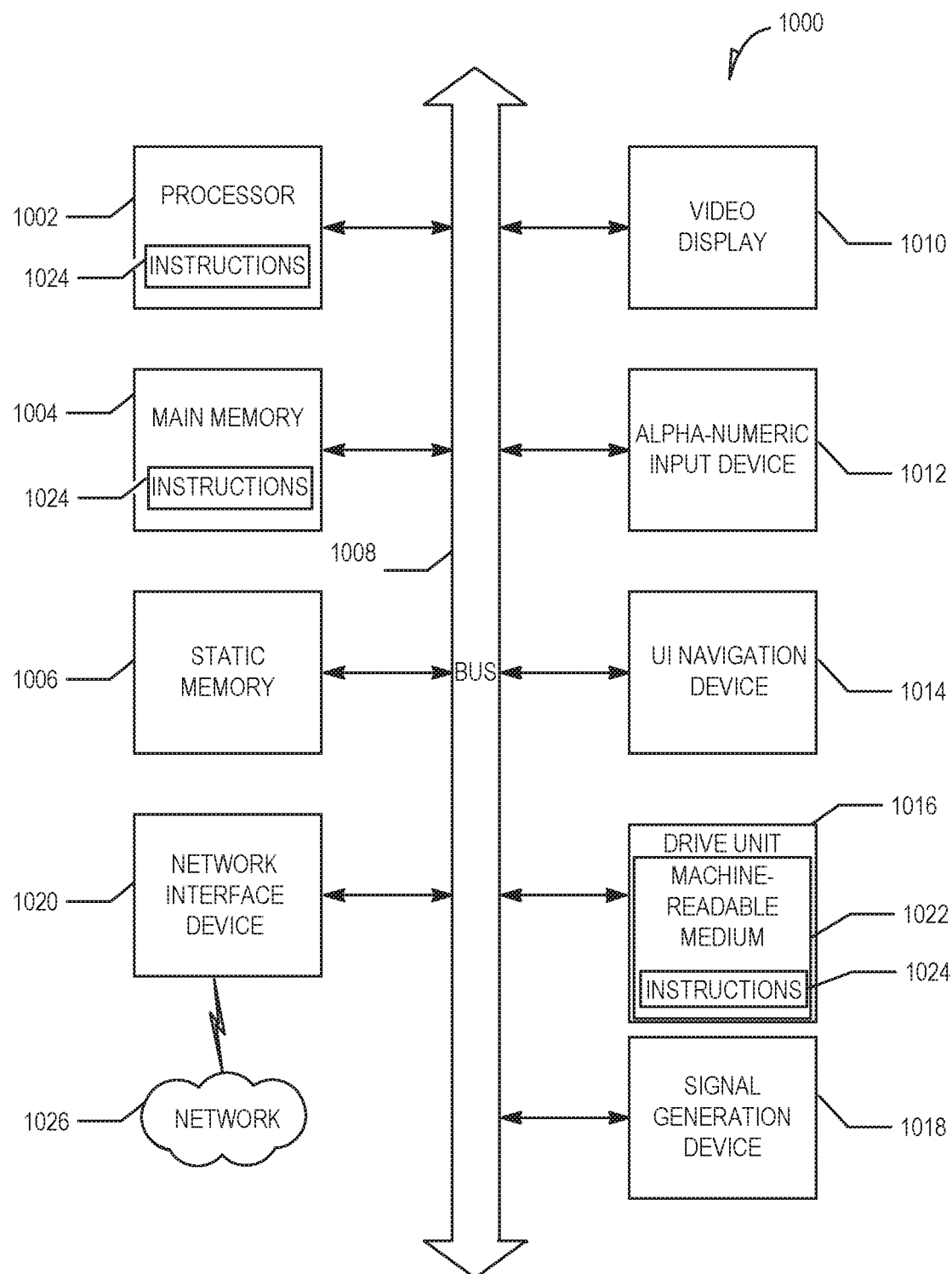
FIG. 10 is a block diagram illustrating an example machine upon which any one or more of the techniques (e.g., methodologies) discussed herein may be performed, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    receiving a request from a first user via an application, for assistance with completion of a document within the application;
    identifying a document intent of the first user based on signals collected by the application, the document intent identifying a goal of the completed document generated with the application;
    determining expected characteristics of the completed document, the expected characteristics identifying:
        a plurality of tasks to be performed to generate the completed document using a feature of the application, the feature being identified based on the document intent, without being identified in the request; and
        a document value calculated based on a set of parameters, wherein the set of parameters includes a value for an intended audience for the completed document;
    performing a computer-implemented matching process to match the first user with a second user based on the plurality of tasks and the document value, wherein the second user has a rating with respect to the calculated document value and is used for the match; and
    configuring permissions of the application to allow collaborative editing within the application between the first user and second user to complete the document.

2. The method of claim 1, further comprising:
    retrieving user characteristics of the intended audience; and
    wherein the document value is further calculated based on the user characteristics of the intended audience.

3. The method of claim 1, wherein the set of parameters include an estimated time of completion of the document for each potential user.

4. The method of claim 1, further comprising:
    determining a type of purpose for the completed document.

5. The method of claim 4, further comprising:
    selecting the set of parameters for use in determining the document value based on the type of purpose.

6. The method of claim 5, wherein the determined type of purpose is a persuasion purpose and the set of selected parameters includes roles of an intended audience of the completed document.

7. The method of claim 5, wherein the determined type of purpose is a marketing purpose and the set of selected parameters includes an estimated launch date for a product.

8. A system comprising:
    at least one processor; and
    a storage device comprising instructions, which when executed by the at least one processor, configure the at least one processor to perform operations:
        receiving a request from a first user via an application, for assistance with completion of a document within the application;
        identifying a document intent of the first user based on signals collected by the application, the document intent identifying a goal of the completed document generated with the application;
        determining expected characteristics of the completed document, the expected characteristics identifying:
            a plurality of tasks to be performed to generate the completed document using a feature of the application, the feature being identified based on the document intent, without being identified in the request; and
            a document value calculated based on a set of parameters, wherein the set of parameters includes a value for an intended audience for the completed document;
        performing a computer-implemented matching process to match the first user with a second user based on the plurality of tasks and the document value, wherein the second user has a rating with respect to the calculated document value and is used for the match; and
        configuring permissions of the application to allow collaborative editing within the application between the first user and second user to complete the document.

9. The system of claim 8, the operations further comprising:
    retrieving user characteristics of the intended audience; and
    wherein the document value is further calculated based on the user characteristics of the intended audience.

10. The system of claim 8, wherein the set of parameters include an estimated time of completion of the document for each potential user.

11. The system of claim 8, the operations further comprising:
    determining a type of purpose for the completed document.

12. The system of claim 11, the operations further comprising:
    selecting the set of parameters for use in determining the document value based on the type of purpose.

13. A computer-readable storage device comprising instructions, which when executed by at least one processor, configure the at least one processor to perform operations comprising:
    receiving a request from a first user via an application, for assistance with completion of a document within the application;
    identifying a document intent of the first user based on signals collected by the application, the document intent identifying a goal of the completed document generated with the application;

determining expected characteristics of the completed document, the expected characteristics identifying:

a plurality of tasks to be performed to generate the completed document using a feature of the application, the feature being identified based on the document intent, without being identified in the request; and a document value calculated based on a set of parameters, wherein the set of parameters includes a value for an intended audience for the completed document;

performing a computer-implemented matching process to match the first user with a second user based on the plurality of tasks and the document value, wherein the second user has a rating with respect to the calculated document value and is used for the match; and configuring permissions of the application to allow collaborative editing within the application between the first user and second user to complete the document.

14. The storage device of claim 13 the operations further comprising:

retrieving user characteristics of the intended audience; and wherein the document value is further calculated based on the user characteristics of the intended audience.

15. The storage device of claim 13, wherein the set of parameters include an estimated time of completion of the document for each potential user.

16. The storage device of claim 13, the operations further comprising:

determining a type of purpose for the completed document.

17. The storage device of claim 16, the operations further comprising:

selecting the set of parameters for use in determining the document value based on the type of purpose.

* * * * *